United States Patent [19]

D'Hooren

[11] Patent Number: 5,453,240
[45] Date of Patent: Sep. 26, 1995

[54] PROCESS FOR MANUFACTURING A MULTILAYER OBJECT BY MOULDING

[75] Inventor: Jean-Jacques D'Hooren, Gondecourt, France

[73] Assignee: Reydel, S.A., Gondecourt, France

[21] Appl. No.: 134,602

[22] Filed: Oct. 12, 1993

[51] Int. Cl.⁶ .............................. B29C 70/40; B29C 45/14
[52] U.S. Cl. ...................... 264/257; 264/154; 264/265; 264/266
[58] Field of Search .................... 264/266, 265, 264/257, 138, 154

[56] References Cited

U.S. PATENT DOCUMENTS

| | | | |
|---|---|---|---|
| 3,122,598 | 2/1964 | Berger | 264/266 |
| 5,104,603 | 4/1992 | Saitoh | 264/266 |
| 5,122,320 | 6/1992 | Masui et al. | 264/266 |

FOREIGN PATENT DOCUMENTS

| | | | |
|---|---|---|---|
| 53-13682 | 2/1978 | Japan | 264/138 |
| 55-126413 | 9/1980 | Japan | 264/154 |
| 1-171924 | 7/1989 | Japan | 264/138 |

*Primary Examiner*—Jay H. Woo
*Assistant Examiner*—Robert B. Davis
*Attorney, Agent, or Firm*—Harrison & Egbert

[57] ABSTRACT

A process for manufacturing a multilayered object by molding having the steps of positioning a sheet of thermoplastic or textile material in a mold, injecting thermoplastic resin under the sheet, and forming the object by compressing the sheet and the resin. A screen is interposed between the sheet and the thermoplastic resin. The permeability of the sheet is a function of the resin and of the compression. An incision of the sheet is formed in the area of the outer face of the sheet.

7 Claims, 1 Drawing Sheet

PROCESS FOR MANUFACTURING A MULTILAYER OBJECT BY MOULDING

TECHNICAL FIELD

The invention relates to a process for manufacturing a multilayer object by moulding, and to an object thus obtained, as well as to an application of the process to the manufacture of dashboards and/or items of trim for vehicle bodywork.

Although it has been developed more particularly for the production of parts in the automotive field, it is nonetheless to be noted that the present invention can be applied to any field in which use is made of objects of various shapes obtained by moulding a thermoplastic material.

BACKGROUND ART

Various moulding processes are known: moulding by casting, by cladding the walls of a mould, by heat forming, blow moulding, or again, injection or compression moulding.

In the case of shaped objects having substantial deformed areas, use is also made of a combination of different processes and, in particular, the technique of injection-compression moulding.

In this case, in a mould of a matching shape is held a sheet of thermoplastic, or textile, material, also known as a "skin", which will form the outer face of the object. Then, into the partially open mould, thermoplastic resin is injected under the said skin to form the inner layer of the object, which layer will give the object volume and holding qualities, as well as a certain strength.

In view of the deformability of the outer skin, the latter is able to mate with the different shapes of the mould and its thickness can be determined to favour this property.

However, there are limits to this process when it is necessary to form an object the outer face of which presents substantial deformed areas which give rise to considerable elongation of the raw materials in order to arrive at the desired shapes, and it is not uncommon to find cracks occurring in the skin through which the inner layer appears.

This is the case, for example, when flat sheets are used to produce panels of door linings with substantial hollow and raised shapes such as locations for decorative panels, integral elbow rests, etc.

Such processes are also unapplicable when using an outer skin having a grained appearance and/or raised patterns. Indeed, if the part in question has substantial deformed areas, whether with sharp edges or otherwise, it is customary to flatten the grain or the patterns in such areas, which impairs the aesthetic appearance of object produced.

The object of the present invention is to provide a process for manufacturing a multilayer object by moulding, the said object having an outer face bearing one or more more or less substantial hollow and/or raised deformed area, which permits use of the injection-compression moulding technique, without this being prejudicial to the aesthetic qualities of the product.

In particular, the process according to the present invention makes it possible to remedy the aforementioned drawbacks and to obtain an outer face of the object of flawless aesthetic appearance, that is to say without causing the appearance of any cracking and/or flattening the patterns on the outer face or harming its grained appearance.

Another object of the present invention is to provide an injection-compression moulded multilayer object one of the advantageous applications of which concerns the field of vehicles and, more precisely, the manufacture of dashboards and/or items of trim for bodywork.

A further object of the present invention is to provide a process for manufacturing a multilayer object the outer face of which can take the form of a skin of small thickness produced, for example, from a noble and more costly material, the volume and holding qualities of the object being imparted by an inner layer, used as a filling material, and less costly.

Further objects and advantages of the present invention will emerge in the course of the description that follows, which is given, however, only by way of illustration and is not intended to limit it.

SUMMARY OF THE INVENTION

According to the invention, the process for manufacturing a multilayer object by moulding, the said object having an outer face bearing one or more more or less substantial hollow and/or raised deformed areas, a process whereby a sheet of thermoplastic or textile material constituting the said outer face is maintained in a mould, and thermoplastic resin is injected under the said sheet, and then the said object is formed by a compression stage, is characterized by the fact that, in the area of one or more predetermined regions, located as a function of the desired deformations:

there is interposed, between the said sheet constituting the said outer face and the said thermoplastic resin, a screen the permeability of which is predetermined as a function of the resin and of the said compression, and there is provided at least one incision, in this area, of the said sheet constituting the said outer face.

The injection-compression moulded multilayer object, obtained, in particular, by implementing the process according to the present invention, constituted by a sheet of thermoplastic or textile material, forming the said outer face, and by an inner, thermoplastic resin based layer, is characterized by the fact that it comprises a screen, provided between the said sheet and resin layer, the permeability of which is a function of the resin, in the area of one or more predetermined regions located as a function of the desired deformations, and comprises at least one notch in the sheet constituting the said outer face in this area.

As already pointed out above, the present invention will find a particular, but not exclusive, application in the manufacture of dashboards and/or items of trim for vehicle bodywork.

BRIEF DESCRIPTION OF THE DRAWINGS

The present invention will be more readily understood from reading the following description accompanied by the annexed drawings, which form an integral part thereof.

DETAILED DESCRIPTION OF THE INVENTION

The invention relates to a process for manufacturing a multilayer object by moulding, the said object having an outer face bearing one or more more or less substantial hollow and/or raised deformed areas, as well as to the object obtained.

Although more especially developed within the framework of the automotive industry, the present invention will apply to any type of object produced by moulding plastic material.

Figure 1A:
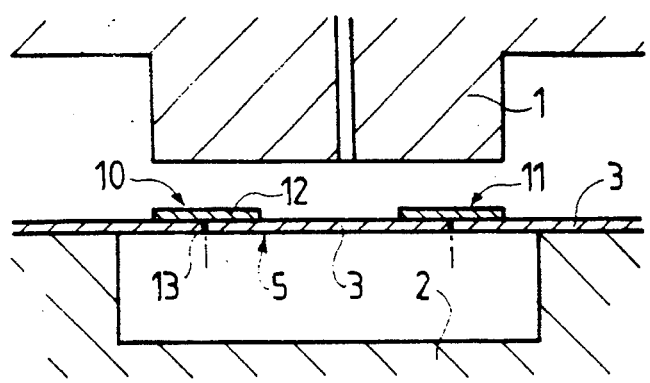
FIGS. 1a, 1b and 1c schematically represent the different stages in the process for manufacturing a multilayer object by moulding according to the invention.

FIGS. 1a, b and c schematically represent the principle of the moulding process according to the present invention implementing a mould which, as a function of the shapes of the object, generally has a male portion 1 and a female portion 2.

The process makes use of the technique known as "injection-compression" which utilises, on one hand, a sheet of thermoplastic or textile material 3 and, on the other hand, thermoplastic resin 4.

More precisely, as shown in FIG. 1a, the previously flat sheet 3, which will form the outer face 5 of the finished object, is held in the mould.

Figure 1B:
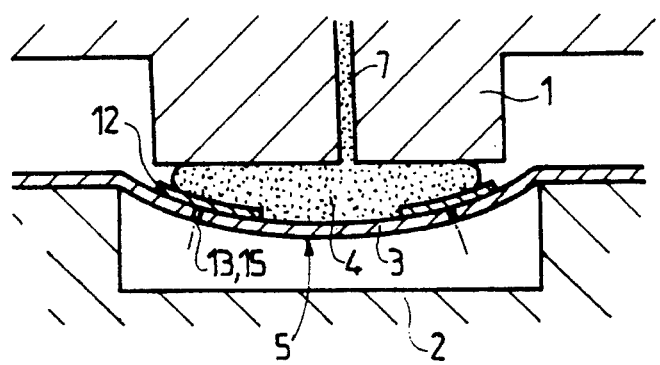

FIG. 1b represents the stage in which the thermoplastic resin 4 is injected under the said sheet 3, that is to say on the side opposite outer face 5.

Figure 1C:
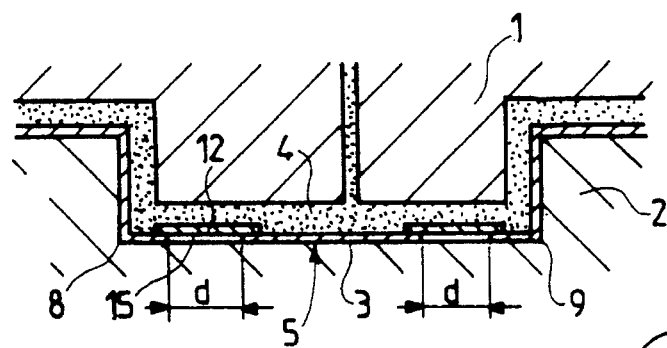
Figure 2:
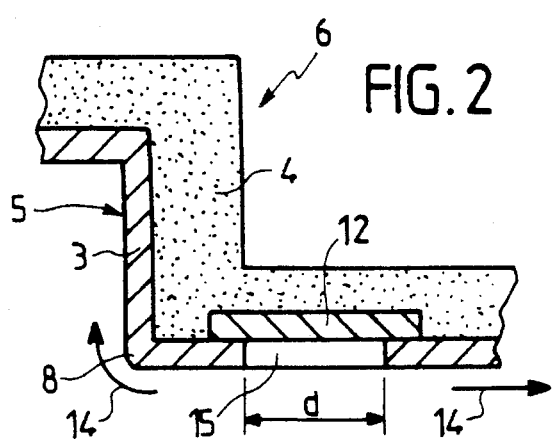
FIG. 2 is a view in partial cross-section of a form of embodiment of an object according to the invention illustrating a detail of its structure.

FIG. 1c shows the compression stage during which the said object, designated by the number 6 and partially shown by way of example in FIG. 2, is formed.

It should be noted that, in these two stages, injection and compression, use is made of the techniques known to a man of the art. In particular, injection is permitted via a channel 7 provided in the male portion 1 of the mould adapted for this purpose, the mould being partially open, and the compression stage consists in bringing together the male portion 1 and the female portion 2 of the mould in order to compress resin 4 between its faces and press it against outer akin 3.

As mentioned at the beginning of the present application, when object 6 has, by virtue of its intended purpose and/or its use, one or more more or less substantial hollow and/or raised deformed areas 8, 9, at the time of compression, the outer skin 3 is stretched, which very often leads to tearing or crushing of the outer sheet, giving the product obtained an aesthetically poor appearance.

Such phenomena are basically a function of the thickness of the outer skin 3, its permitted elongation and the extent of the deformed areas. For example, for a small possible elongation value in the order of 20%, all deformations in the order of 10% would be considered as major. On the other hand, in the case of a material capable of tolerating deformation of up to 200%, the deformations due to heat forming would be considered as major if they reached 100 to 150%.

To remedy this drawback, according to the present invention, in the area of one or more predetermined regions 10, 11, located as a function of the desired deformations 8, 9 of the object, a screen 12 is interposed between sheet 3 of thermoplastic or textile material and the layer of resin 4, and at least one incision 13 in sheet 3 is provided in this area.

Thanks to such arrangements, at the time of the compression stage, sheet 3 will be "slackened off" to allow it to be deformed, to match the moulds 1 and 2, without this thereby being prejudicial to its thickness or to its appearance, that is to say in order to reduce the stresses in the sheet in the visible regions.

Figure 3:
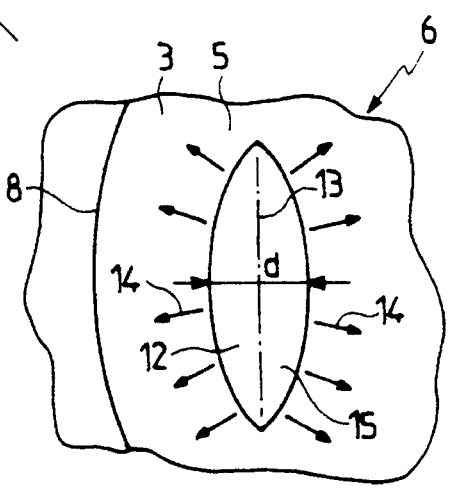
FIG. 3 is a partial bottom view of the object illustrated in FIG. 2.

In other words, as shown in particular by arrows 14 in FIGS. 2 and 3, the material of sheet 3 will be displaced radially in relation to incision 13 to form a notch 15.

This notch 15, the width of which is designated by "d" in the figures, is created by the displacement of the material, which makes it possible to avoid stretching the film or compressing it excessively in order to mate with the shape of the mould, particularly in the area of the desired deformations of the object.

Under these conditions, marks are not left on the deformed areas 8, 9 after moulding and, if the outer face 5 of the sheet 3 had raised portions or a grained appearance, these are preserved in their entirety, and the visible face of the object does not present an unaesthetic appearance in the area of the edges. This also makes it possible to prevent any tearing in this area.

In many cases, steps will be taken to ensure that the screen 12 and the incision or incisions 13 are provided in regions of outer face 5 that are hidden when the said object 6 is in use.

However, one could also contemplate using a coloured screen and special shapes for notches 15 in order to make the object aesthetically pleasing.

As to screen 12, it will be chosen to be of a permeability which is predetermined as a function of the thermoplastic resin and of the compressive force applied during the compression stage.

More precisely, this permeability is the result of a compromise between good adherence of the resin 4 and screen 12, to prevent blistering, and the formation of a barrier, to prevent the resin from passing through the notch 15 during compression.

By way of example, using conventional thermoplastic resins such as polyethylene, polypropylene or ABS, good results were obtained by providing a screen 12 taking the form of a non-woven fabric of synthetic fibres, such as, in particular, polyester, polyamide or glass, with a density of between 30 and 150 g/m$^2$.

In the figures, the said screen 12, in the predetermined regions 10, 11, takes the form of individual pieces. One could, however, contemplate using a continuous sheet of non-woven fabric which would then form a continuous screen, interposed between the outer sheet 3 and the inner layer of resin 4.

Furthermore, to enhance the aesthetic appearance of the product obtained, according to the present invention, the said sheet 3 of thermoplastic or textile material can have, on outer side 5, a grained aspect and/or raised patterns.

In this connection, use is made, for example, of a sheet 4 taking the form of a film of polyvinyl chloride (PVC), pregrained or bearing patterns such as saddle stitching, etc.

This being the case, as shown in FIG. 2, the multilayer object 6 obtained by injection-compression moulding, the outer face 5 of which has one or more hollow and/or raised deformed areas 8, 9, is constituted by an outer skin 3, in particular of PVC, and by an inner layer of thermoplastic resin 4, polymerized using techniques known to a man of the art, between which is provided a screen 12, in the area of one or more predetermined regions 10, 11, located as a function of the desired deformations, the thermoplastic sheet 3 comprising at least one notch 15 in this area.

The manufacture of dashboards and/or items of trim for vehicle bodywork will benefit considerably from the present invention as the stresses and arrangements described hereabove are to be encountered in such fields.

It goes without saying that other implementations of the present invention, within the grasp of a man of the art, could likewise have been contemplated without thereby departing from the scope of the present application.

I claim:

1. A process for manufacturing a multilayered object by moulding, the object having an outer face bearing at least one generally hollow or raised deformed area, the process comprising the steps of:

clamping a sheet of thermoplastic or textile material in a mould, said sheet having at least one predetermined region corresponding to the deformed area, said sheet having an incision at such predetermined region;

positioning a screen in the predetermined region against said sheet;

injecting a thermoplastic resin onto said screen and said sheet, said screen interposed between said sheet and said thermoplastic resin;

applying a compressive force to the thermoplastic resin and said sheet in the mould so as to form the object, said screen having a permeability which is a function of the thermoplastic resin and of the compressive force supplied.

2. The process according to claim 1, wherein said screen and said incision are placed in regions of the outer face that are concealed during use of the object.

3. The process according to claim 1, wherein said screen is in individual pieces or a sheet of non-woven fabric.

4. The process according to claim 3, wherein said screen is a non-woven fabric of synthetic fibers having a density of between 30 and 150 $g/m^2$.

5. The process according to claim 1, wherein said sheet has a grained pattern on one side.

6. The process according to claim 1, wherein said sheet has a raised pattern on one side.

7. The process according to claim 1, wherein said sheet is a film of polyvinyl chloride material.

* * * * *